C. ELLIS.
PROCESS OF HYDROGENATION.
APPLICATION FILED FEB. 20, 1917.
1,345,589.
Patented July 6, 1920.
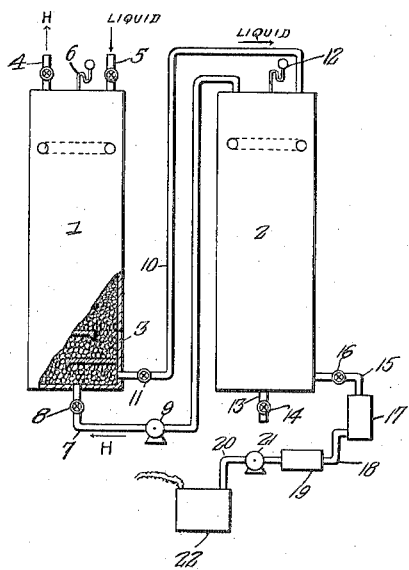

UNITED STATES PATENT OFFICE.

CARLETON ELLIS, OF MONTCLAIR, NEW JERSEY.

PROCESS OF HYDROGENATION.

1,345,589.    Specification of Letters Patent.    Patented July 6, 1920.

Original application filed March 29, 1912, Serial No. 686,988. Divided and this application filed February 20, 1917. Serial No. 149,747.

*To all whom it may concern:*

Be it known that I, CARLETON ELLIS, a citizen of the United States, residing at Montclair, in the county of Essex and State of New Jersey, have invented certain new and useful Improvements in Processes of Hydrogenation, of which the following is a specification.

The present invention relates to an improvement in effecting chemical reactions between hydrogen and an organic material capable of reacting therewith in the presence of a catalyst, preferably a colloidal catalyst such as nickel, cobalt, iron, platinum, palladium, chromium, manganese, titanium, molybdenum, vanadium, thorium and zirconium, or their oxids, carbids, silicids and the like, the action of which colloidal catalysts may be aided by the employment of filling materials, such as granular charcoal, which may also carry catalyzer material, or the charcoal may be lightly impregnated or coated with nickel or other catalyst. The conduit or receptacle in which the catalytic action is carried on may be provided with a lining of catalytic material, such as nickel or the other metals or compounds thereof above referred to. The filling material may also consist of various other materials having catalytic activity, being in fragmental form, such materials as selenium, tellurium and the like being suitable for this purpose.

As examples of the organic material to be treated, I mention by way of example the following: fatty oils, including normally liquid oils, such as cottonseed, castor, peanut, mustard, soya bean, corn, fish, and perilla oil, these being mentioned as examples of drying or semi-drying oils, in addition to which I would mention fatty acids, such as oleic or linoleic acids, or fatty acid mixtures, also glycerids such as oleins or linoleins, or mixtures of such materials; likewise semi-solid or solid fats, which it is desired to improve, such as lanolin and the like; also resins such as dammar, sandarac, mastic, shellac, elemi, thus, copal, pontianac and ordinary rosin; pitches, tars, asphaltic oils, malthas, petroleum, naphthalene and rubber; also waxes such as Japan, montan, beeswax and others.

In carrying out the process of my present invention, I preferably circulate the organic material, and also the hydrogen or hydrogen-containing gas, these passing through the treating tower or receptacle, preferably in opposite directions, the organic material being treated in a liquid state and flowing downwardly through the receptacle or tower, while the hydrogen passes upwardly therethrough.

Without limiting myself to particular apparatus, I will state that such an apparatus as is shown in my copending application 686,988, filed March 29, 1912, renewed as No. 119,408, September 11, 1916 (now Patent No. 1,217,118) of which the present application is a division may be used, or various other forms of apparatus.

In the annexed drawing, I have shown a suitable form of apparatus, namely, that shown in the present case above referred to. In said drawings, which are more or less diagrammatic, the device is shown in elevation with a portion of one tower shown in section. In the drawing 1 and 2 are containers or towers of considerable height. These towers may if desired be packed with granular material of a non-metallic nature, such for example, as granules of charcoal, or if desired, with non-metallic material carrying or retaining a metallic catalyzer, the non-metallic material being active or inactive as the case may be. The towers have baffles in some cases and as shown at 3, the baffles have a lip which allows the gases to collect at the other side of the baffles to form gas-pockets. 4 is the outlet for the gas discharging at 1, and this gas may be carried back to the tower 2 and travel through the system in a cyclic path preferably after having been washed. The material to be hydrogenated enters at the inlet 5. 6 is a pressure gage. The tanks 1 and 2 are shown heated by steam coils through which superheated steam may be passed. A pipe 7 leads from the lower part of the tower 1 to the upper part of the tower 2 and serves to convey hydrogen gas from the latter to the former. A pipe 10 runs to the top of the tank 2 from the bottom of the tank 1. Hydrogen is generated in the electrolytic cell, 22 and is forced by the pump 21 into the purifiers 19 and 17, then passes into the tower 2 moves upwardly therethrough and then is forced into the tower 1 where it travels upwardly in the same manner coming in intimate contact with the material to be hydrogenated which is flowing in the opposite direction and being heated and if needful compressed to the point required for the most effective reaction. Finally any residual gases discharging at 4 may be taken back to the pump 21 and used again in the system in so far as they may contain any useful hydrogen content.

It may be noted that the feature of using a tall column (or deep body) of the fluid material to be hydrogenated is of some importance, in cases where a long period of contact of the hydrogen with the organic material is desired.

The hydrogenating gas may be pure hydrogen or hydrogen in more diluted condition, such as uncarbureted water-gas. The hydrogen when employed in the presence of a colloidal catalyst should preferably be entirely free from oxygen, since even small traces of oxygen have highly detrimental effect upon the activity of the catalyst, this being particularly noticeable in the case of the colloidal non-noble metal catalysts above referred to. The gas for a similar reason should preferably be entirely free from chlorin and arsenic and other materials capable of deleteriously affecting the catalyst.

A feature of importance is the possibility of regulating the heating to suit the different stages of reaction. The absorption of hydrogen appears to be progressive as regards its union in a compound containing, for example, two double bonds. The first bond being satisfied under conditions of heating best suited therefor, the second bond is then treated under conditions specific therefor, as regards the absorption of hydrogen. Obviously this would be a very complicated matter if carried out in a closed vessel intermittently, but in the continuous method included in this invention such specific thermal or other treatment is made possible. Depending on the oil or grease in hand, the heating may be increased progressively or decreased progressively or otherwise, as the material flows along the treating conduit.

The gas is employed preferably under superatmospheric pressure, a pressure of from 10 to 25 pounds per square inch being suitable for the purpose.

The temperature employed is preferably so high that any metallo-organic compounds derived by union of the catalyzer metal and organic acids or radicals contained in or derived from the organic material employed, would be unstable under these existing conditions. Such metallo-organic compounds would not accordingly be present to any material extent in the final product, but would be decomposed about as rapidly as formed.

The organic material will be treated in a liquid state and this may be brought about, in the case of normally solid materials, either by melting or by solvents. If solvents are used, the liquid will still preferably be heated, temperatures best adapted to the particular organic material, as in the parent application being used. Without limiting myself to exact temperatures, a temperature of about 150 to 200° C. is generally applicable.

As examples of suitable solvents to be employed, I mention hydrocarbon volatile liquids, e. g. gasolene, texene, petroleum, etc., although various solvents for the different organic bodies enumerated, may be used. The solvent will in all cases be one that will have no deleterious effect on the catalyst. The solvent may be separated from the product by fractional distillation, or otherwise.

What I claim:

1. A process of hydrogenating aromatic organic material containing unsaturated components, which comprises subjecting a flowing current of such material carrying a colloidal catalyst, to the action of a counter current of a hydrogen-containing gas, said materials being maintained at a temperature at which such material can react upon each other.

2. A process of hydrogenating organic material containing unsaturated components, which comprises subjecting a flowing current of such material carrying a colloidal non-noble metal catalyst, to the action of a counter current of a hydrogen-containing gas, said treatment being effected in a receptacle provided with a lining of catalytic material, said materials being maintained at a temperature at which such materials can react upon each other.

3. The improvement in the art of hydrogenation which comprises circulating a current of an aromatic organic material containing ingredients capable of hydrogenation; circulating a current of a hydrogen-containing gas; and bringing said two circulating currents into counter-current contact with each other in the presence of a hydrogenating catalyst.

4. The process which comprises subjecting to the action of a hydrogen-containing gas, a mixture comprising a colloidal catalyst and a liquid organic aromatic material containing ingredients which are capable of reacting with hydrogen, while in the continued presence of a catalyst retained within the reaction receptacle, and which is without movement relative to said receptacle.

5. In the hydrogenation of organic material containing hydrocarbons, the step of subjecting to the action of a current of a hydrogen-containing gas, a liquid organic material comprising ingredients capable of reacting with hydrogen, which material is solid at ordinary room temperature, while containing a freely movable catalyst and while in the presence of a stationary catalyst, and while in the absence of catalyzer poisons.

6. The process of hydrogenating aromatic bodies which comprises subjecting the same to the action of hydrogen in the presence of a colloidal non-noble-metal-containing catalyst, while maintaining the aromatic material in a liquid, substantially non-gaseous state.

7. The process of effecting a reaction between an aromatic body free from fatty material which comprises treating such body with hydrogen and a catalyst comprising colloidal metal having an atomic weight between 48 and 63.6 while maintaining the aromatic body in a liquid state.

8. The process of treating aromatic organic bodies capable of reacting with hydrogen, which comprises incorporating colloidal non-noble metal catalyzer with said bodies and exposing the mixture to hydrogen while maintaining said bodies in a substantially liquid condition; whereby hydrogen reacts with said bodies.

9. The process of treating aromatic organic material capable of becoming reduced by hydrogen, which comprises passing hydrogen into contact with a body of said material in a liquid state and in the presence of a catalyzer suspended in said material, and in a receptacle having therein a stationary catalyst, circulating both hydrogen and organic material, whereby said material becomes reduced.

10. A process of hydrogenating an aromatic hydrocarbon which comprises subjecting such hydrocarbon to the action of hydrogen in the presence of a catalyst comprising a metal of the sixth group of the periodic system.

11. A process of hydrogenating an aromatic hydrocarbon which comprises subjecting such hydrocarbon to the action of hydrogen in the presence of a catalyst comprising a metal having an atomic weight between 48 and 63.6, such catalyst being in the colloidal state.

12. In the treatment of an aromatic organic material with hydrogen, the step of treating the same with hydrogen in the presence of a colloidal metal having an atomic weight between 48 and 63.6, while said organic material is dissolved in an organic solvent.

13. A process of hydrogenating which comprises subjecting hydrocarbon material containing considerable amounts of unsaturated bodies to the action of hydrogen, in the presence of a colloidal metal having an atomic weight between 48 and 63.6.

14. The process which comprises exposing naphthalene, in a liquid state, while carrying a colloidal non-noble metal catalyst, to the action of a hydrogen-containing gas.

15. The process of treating naphthalene which comprises mixing the same with a catalytic body comprising a metal having an atomic weight between 48 and 63.6, such catalytic body being in a sufficiently finely-divided state to form a suspension in the naphthalene when the latter is in a liquid condition, and exposing a deep body of the mixture in a liquid state, to a hydrogen-containing gas introduced at the lower part thereof, whereby hydrogen is caused to combine with the naphthalene.

16. The herein described process which comprises mixing naphthalene with a finely-divided catalyzer comprising a metal having an atomic weight between 48 and 63.6, said catalyzer being in a sufficiently finely-divided state to be readily held in suspension in the naphthalene when the latter is in a liquid state, causing a flowing current carrying the naphthalene in a liquid state and suspended catalyzer to come into contact with a flowing current of hydrogen-containing gas, whereby the hydrogen is caused to combine with the said naphthalene.

17. The herein described process which comprises mixing naphthalene with a finely-divided catalyzer comprising a metal having an atomic weight between 48 and 63.6, said catalyzer being in a sufficiently finely-divided state to be readily held in suspension in the naphthalene when the latter is in a liquid state, causing a flowing current of material containing the naphthalene in a liquid state and suspended catalyzer to come into contact with a counter-flowing current of hydrogen-containing gas, whereby the hydrogen is caused to combine with the said naphthalene.

18. A process which comprises exposing naphthalene in a liquid state maintained in motion to the action of a hydrogen-containing gas in the presence of a catalyzer containing a metal having an atomic weight between 48 and 63.6, whereby hydrogen is caused to unite with the naphthalene.

19. A process of hydrogenating naphthalene which comprises circulating naphthalene in a liquid state in contact with hydrogen and a catalyst comprising a metal having an atomic weight between 48 and 63.6, at a temperature at which the catalyst can cause the hydrogen to combine with the naphthalene.

20. The herein described process which comprises mixing an aromatic organic substance with a finely-divided catalyzer comprising a metal having an atomic weight between 48 and 63.6, said catalyzer being in a sufficiently finely-divided state to be readily held in suspension in the organic substance when the latter is in a liquid state, causing a flowing current carrying the organic substance in a liquid state and suspended catalyzer to come into contact with a flowing current of hydrogen-containing gas, whereby the hydrogen is caused to combine with the said organic substance.

21. A process which comprises exposing an aromatic organic substance in a liquid state maintained in motion to the action of a hydrogen-containing gas in the presence of a catalyzer containing a metal having an atomic weight between 48 and 63.6, whereby hydrogen is caused to unite with the organic substance.

22. A process of hydrogenating an aromatic organic substance which comprises circulating said organic substance in a liquid state in contact with hydrogen and a catalyst comprising a metal having an atomic weight between 48 and 63.6, at a temperature at which the catalyst can cause the hydrogen to combine with the said organic substance.

23. In a hydrogenation of an organic aromatic hydrocarbon, the step of treating the same with hydrogen in the presence of a catalytic metal having an atomic weight between 48 and 63.6, while said hydrocarbon is, at least in part, dissolved in a solvent which is free from deleterious action on said catalyst, and while the mass is maintained in motion.

24. A process of hydrogenating naphthalene which comprises circulating naphthalene in a liquid state and hydrogen in contact with a catalyst comprising a metal having an atomic weight between 48 and 63.6, at a temperature at which the catalyst can cause the hydrogen to combine with the naphthalene.

25. In the hydrogenation of naphthalene, the step of treating the same with hydrogen in the presence of a catalytic metal having an atomic weight between 48 and 63.6, while said naphthalene is, at least in part, dissolved in a solvent which is free from deleterious action on said catalyst and while the mass is maintained in motion.

In testimony whereof I affix my signature.

CARLETON ELLIS.